(12) United States Patent
Sylvester

(10) Patent No.: US 6,974,563 B2
(45) Date of Patent: *Dec. 13, 2005

(54) ION EXCHANGE MATERIALS FOR THE SEPARATION OF $^{90}$Y FROM $^{90}$SR

(75) Inventor: Paul Sylvester, Waltham, MA (US)

(73) Assignee: Lynntech, Inc., College Station, TX (US)

( * ) Notice: Subject to any disclaimer, the term of this patent is extended or adjusted under 35 U.S.C. 154(b) by 348 days.

This patent is subject to a terminal disclaimer.

(21) Appl. No.: 10/173,971

(22) Filed: Jun. 18, 2002

(65) Prior Publication Data

US 2003/0231994 A1 Dec. 18, 2003

(51) Int. Cl.$^7$ .......................... C01F 11/00; C01F 17/00
(52) U.S. Cl. ........................................ 423/2; 423/21.5
(58) Field of Search ..................................... 423/2, 21.5

(56) References Cited

U.S. PATENT DOCUMENTS

| | | | |
|---|---|---|---|
| 3,156,532 A | | 11/1964 | Doering et al. |
| 3,706,689 A | | 12/1972 | Haskins et al. |
| 5,154,897 A | | 10/1992 | Ehrhardt et al. |
| 5,368,736 A | | 11/1994 | Horwitz et al. |
| 5,494,647 A | | 2/1996 | Huntley |
| 5,512,256 A | | 4/1996 | Bray et al. |
| 5,902,566 A | * | 5/1999 | Chinol et al. .............. 424/1.49 |
| 6,309,614 B1 | * | 10/2001 | Horwitz et al. ................ 423/2 |

FOREIGN PATENT DOCUMENTS

| | | |
|---|---|---|
| EP | 0 578 050 A1 | 1/1994 |
| EP | 0578050 A1 | 1/1994 |
| GB | 1295376 | 11/1972 |
| WO | WO 97/33628 | 9/1997 |
| WO | WO 00/52031 A3 | 9/2000 |

OTHER PUBLICATIONS

"Chemistry for Commercial Scale Production of Yttrium–90 for Medical Research;" J.S. Wike, et al.; *Appl. Radiat. Isot.* vol. 41, No. 9, pp. 861–865, 1990; *Int. J. Radiat. Appl. Instrum.* Part A, no month.

"Improved Chemistry for the Production fo Yttrium–90 for Medical Applications*"; Mark L. Dietz and E. Philip Horwitz; *Appl. Radiat. Isot.*, vol. 43, No. 9, pp. 1093–1101, 1992; *Int. J. Radiat. Appl. Instrum.* Part A.

"Assessment of a Sodium Nonatitanate and Pharmacosiderite–Type Ion Exchangers for Strontium and Cesium Removal from DOE Waste Simulants;" Elizabeth A. Behrens, et al.; Environmental Science & Technology; vol. 32, No. 1, 1998; pp. 101–107, no month.

"Evaluation of a Sodium Nonatitanate, Sodium Titanosilicate, and Pharmacosiderite–Type Ion Exchangers for Strontium Removal from Doe Waste and Hanford N–Springs Groundwater Simulants;" *Science and Technology for Disposal of Radioactive Tank Wastes*; Elizabeth A. Behrens, et al.; pp. 287–299.

"Titanium silicates, $M_3HTi_4O_4(SiO_4)_3$ $4H_2O$ (M=Na$^+$, K$^+$), with three–dimensional tunnel structures for the selective removal of strontium and cesium from wastewater solutions"; Elizabeth A. Behrens and Abraham Clearfield; Microporous Materials 11 (1997), pp. 65–75, no month.

"Assessment of a Sodium Nonatitanate and Pharmacosiderite–Type Ion Exchangers for Strontium and Cesium Removal from DOE Waste Simulants"; Elizabeth A. Behrens, Paul Slyvester, and Abraham Clearfield; Environmental Science Technology; 1998, 32, pp. 101–107, no month.

Paul Slyvester and Abraham Clearfield, Solvent Extraction and Ion Exchange, 16 (6), 1527–1539 (1998), The Removal of Strontium and Cesium From Simulated Hanford Groundwater Using Inorganic Ion Exchange Materials, no month.

* cited by examiner

*Primary Examiner*—Steven Bos
(74) *Attorney, Agent, or Firm*—Streets & Steele; Frank J. Campigotto; Jeffrey L. Streets

(57) ABSTRACT

Inorganic ion exchange materials for the separation of $^{90}$Y from $^{90}$Sr include clinoptilolite, potassium titanosilicate pharmacosiderite, sodium titanosilicate and sodium nonatitanate. These materials are suitable for making a $^{90}$Y generator that contains $^{90}$Sr immobilized on an ion exchange column of the materials. The materials have a very high selectivity for $^{90}$Sr, a very low selectivity for $^{90}$Y, good radiation and thermal stability, low toxicity, fast reaction kinetics, and can be readily and reproducibly synthesized. A method is thus provided for eluting $^{90}$Y from the ion exchange material with an aqueous solution to obtain a carrier-free solution of $^{90}$Y.

25 Claims, 3 Drawing Sheets

US 6,974,563 B2

ION EXCHANGE MATERIALS FOR THE SEPARATION OF $^{90}$Y FROM $^{90}$SR

This invention was made with government support under grant number 1 R43 RR15167-01 awarded by the Department of Health and Human Services (National Institutes of Health). The government has certain rigts in this invention.

BACKGROUND OF THE INVENTION

1. Field of the Invention

This invention relates to methods, apparatus and compositions for separating yttrium-90 from strontium-90.

2. Background of the Related Art

The use of radioactive isotopes as diagnostic, imaging and therapeutic agents is a relatively new area of medicine that has flourished in the last fifty years. A number of radioisotopes, primarily beta emitting radionuclides, are finding use in the in vitro treatment of cancers to destroy or sterilize cancer cells. The treatment is administered in a series of cycles to avoid radiotoxicity to other areas of the body, particularly the kidneys and bone marrow. The isotopes of interest are commonly attached to monoclonal antibodies specific for the cancer cells to be treated, thus delivering a dose of radiation directly to a tumor. This technique is termed radioimmunotherapy (RIT) and is increasingly being used to complement existing surgical techniques and chemotherapy.

In order to fuel the current research in the use of radionuclides to treat cancers, it is essential that new isotope production methods be developed to increase the availability and decrease the cost of radioisotopes. For medicinal applications, the radioisotope supplied needs to be radiochemically pure to prevent the accidental introduction of unwanted additional radionuclides into a patient, and, preferably, be carrier free. A fundamental aspect of increasing the availability of radioisotopes to medical personnel is the development of new, inexpensive, radiolytically stable materials to allow the necessary separations to be achieved.

$^{90}$Y is a high-energy beta emitter that is finding use in the treatment of certain forms of cancer. $^{90}$Y decays by pure beta emission, with a half-life ($T_{1/2}$) of 64 hours, to stable $^{90}$Zr. The energetic beta particles (2.3 MeV) can penetrate an average of 0.5 cm in human tissue, with a maximum penetration of up to 1 cm. Consequently, they are useful in the treatment of cancerous tumors like those found in Hodgkin's disease, where tumors are typically between 1 and 5 cm in diameter. The $^{90}$Y can be successfully attached to an antibody, which will then transport the $^{90}$Y to the targeted tumor.

In order to use $^{90}$Y in the treatment of cancers, it is necessary to obtain a very pure source of the isotope that is free from the parent $^{90}$Sr. This is essential because $^{90}$Sr has a 28 year half-life and is likely to accumulate in the bone if inadvertently introduced into the body. The maximum tolerable amount of $^{90}$Sr fixed in the bone is only 2 $\mu$Ci and consequently great care needs to be performed to achieve the necessary Sr/Y separation to ensure minimal introduction of $^{90}$Sr into the body during the $^{90}$Y radiotherapy.

$^{90}$Y is the daughter product of $^{90}$Sr, an abundant fission product of $^{235}$U, found in nuclear wastes resulting from the reprocessing of spent commercial nuclear fuel and in the separation of $^{239}$Pu for weapons manufacture. $^{90}$Sr has a half-life of approximately 28 years. The radioactive decay scheme is outlined in Equation 1 below.

$$^{90}Sr(\beta^-) \rightarrow {}^{90}Y(\beta^-) \rightarrow {}^{90}Zr \quad (1)$$

In order to obtain a supply of $^{90}$Y, it is first necessary to separate $^{90}$Sr from other isotopes in the nuclear waste. This can readily be achieved using selective precipitation, ion exchange or solvent extraction techniques to produce a crude $^{90}$Sr 'cow' for use as a source of $^{90}$Y. $^{90}$Y can also be produced by the neutron irradiation of $^{89}$Y oxide, $Y_2O_3$, for a period ranging from several days to a week, but this is expensive and the $^{90}$Y product contains large amounts of inactive $^{89}$Y, making it unsuitable for medicinal applications.

There are a number of methods described in the literature for the separation of the $^{90}$Y daughter from the parent $^{90}$Sr, including solvent extraction, ion exchange, precipitation and chromatographic procedures. Of these methods, ion exchange techniques have probably received the most attention. However, all of the current methods suffer from drawbacks. For instance, in some separation procedures, the $^{90}$Sr is held onto an organic cation exchange resin and the $^{90}$Y is eluted using an aqueous complexant solution, such as EDTA, oxalate, lactate, citrate etc. Consequently, the purified $^{90}$Y is generated as a complex that is not suitable for the direct labeling of antibodies and requires further processing. Organic ion exchange resins are also prone to radiation damage resulting in a decrease in capacity and the potential release of toxic organic molecules into the $^{90}$Y stream as the resin decomposes. Consequently, there is a need for new material and methods to produce pure $^{90}$Y.

The method disclosed by Bray and Webster in U.S. Pat. No. 5,512,256 uses a solvent extraction process to separate $^{90}$Y from $^{90}$Sr. A 0.3M solution of di(2-ethylhexyl) phosphoric acid (HDEHP) in n-dodecane is used to extract $^{90}$Y from a solution of $^{90}$Sr/$^{90}$Y in 0.3M nitric acid. The HDEHP selectively extracts the $^{90}$Y into the organic phase and residual $^{90}$Sr can be removed by further washing the organic fraction with fresh 0.3M nitric acid. Although this method is very effective at separating $^{90}$Y from $^{90}$Sr, multiple steps are required and the recovery of both the $^{90}$Sr cow and $^{90}$Y fractions requires multiple washing and stripping phases. This produces waste organic and aqueous streams that need to be treated and disposed of safely. There will also be some radiolysis of both the organic complexant and the solvents that will limit their useful life and also may cause the release of unwanted organic species into solution. This is the primary method utilized to produce $^{90}$Y in the USA today.

In U.S. Pat. No. 5,368,736, Horwitz and Dietz use a multiple step chromatographic process to separate $^{90}$Sr from $^{90}$Y. The $^{90}$Sr stock solution in 3M nitric acid is passed through three strontium selective chromatographic ion exchange columns in series so that the solution exiting the third column contains essentially only $^{90}$Y, the $^{90}$Sr being retained on the columns. This raw $^{90}$Y solution is the passed through a rare earth selective column that selectively extracts the $^{90}$Y. The purified $^{90}$Y can then be eluted off the column. However, the chromatographic columns contain organic resins that are susceptible to radiation damage and may leach undesirable radiolysis fragments into the purified $^{90}$Y stream. Radiation damage is kept to a minimum by loading and then eluting the radioactivity from the columns, but this method also requires the use of a dedicated hot cell facility, necessitating shipment of the purified $^{90}$Y to the end user.

Huntley's U.S. Pat. No. 5,494,647 discloses an ion exchange process for separating $^{90}$Y from $^{90}$Sr using CHELEX-100® (Bio-Rad Laboratories, Richmond, Calif.), a chelating ion exchange resin. CHELEX-100® is an organic ion exchange resin that consists of iminodiacetic acid groups mounted on a polystyrene/divinyl benzene substrate. The method is designed for use with environmental samples only containing trace amounts of $^{90}$Sr, and it is disclosed that the method does not work effectively at high strontium concentrations. The organic resin would also be susceptible to radiation damage and it is doubtful that the method would be able to produce the level of $^{90}$Y purity required for medicinal applications.

Therefore, there is a need for improved methods, apparatus, and compositions for separating yttrium-90 from strontium-90. It would be desirable if the compositions were highly radiation resistant, thermally stable, chemically stable, and non-toxic. It would be even more desirable if the compositions and methods provided very high affinities for strontium-90 and very low affinities for yttrium-90.

SUMMARY OF THE INVENTION

The present invention provides a process for separating strontium-90, comprising the adsorption of strontium-90 onto an inorganic ion exchange material from a solution containing a source of strontium-90. The solution is preferably neutral or near neutral. The process may entail selecting the inorganic ion exchange material from clinoptilolite, potassium titanosilicate pharmacosiderite, sodium titanosilicate, sodium nonatitanate, and combinations thereof.

In a preferred embodiment, the inorganic ion exchange material is sodium nonatitanate prepared by reacting titanium isopropoxide and aqueous sodium hydroxide at a temperature between 100° C. and 250° C. for a period between 12 hours and 2 weeks. Optionally, the inorganic ion exchange material is sodium titanosilicate prepared by hydrothermally heating a titanium silicate gel in NaOH. Said titanium silicate gel may be hydrothermally heated in 6M NaOH at 170° C. for 2 days.

In another preferred embodiment, the inorganic ion exchange material is a titanosilicate having the general formula:

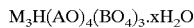

$M_3H(AO)_4(BO_4)_3 \cdot xH_2O$ where: M is a cation selected from H, K, Na, Rb, Cs and mixtures thereof;

A is selected from Ti and Ge; and

B is selected from Si and Ge; and x is a value between 4 and 6.

The invention further provides a yttrium-90 generator prepared according to the aforementioned process. This generator may comprise inorganic ion exchange material selected from clinoptilolite, chabazite, potassium titanosilicate pharmacosiderite, sodium titanosilicate, sodium nonatitanate, or other inorganic compounds with a high affinity for strontium, and combinations thereof. The inorganic ion exchange material may be formed into pellets having a diameter between 0.2 and 0.5 mm. Optionally, the pellets comprise polyacrylonitrile, or another polymer, as a binder. Alternatively, the pellets may comprise amorphous titanium dioxide, clay, amorphous silica, amorphous zirconia, or another inorganic oxide as the binder.

The invention provides a process for separating yttrium-90 from strontium-90, comprising preparing a solution of strontium-90 then adsorbing strontium-90 from the solution onto an inorganic ion exchange material, and eluting yttrium-90 from the inorganic ion exchange material with an aqueous solution. The process may further comprise the step of allowing yttrium-90 to grow into the inorganic ion exchange material. These steps may be repeated. Optionally, the inorganic ion exchange material is selected from clinoptilolite, chabazite potassium titanosilicate pharmacosiderite, sodium titanosilicate, sodium nonatitanate, or other inorganic compounds with a high affinity for strontium, and combinations thereof.

The invention also provides a process for preparing a carrier-free solution of yttrium-90, comprising preparing a solution, containing strontium-90, then adsorbing strontium-90 from the solution onto an inorganic ion exchange material, subsequently washing the inorganic ion exchange material to remove unabsorbed strontium-90, allowing yttrium-90 to grow into the inorganic ion exchange material, and eluting yttrium-90 from the inorganic ion exchange material. These steps may be repeated. Optionally, the inorganic ion exchange material is selected from clinoptilolite, chabazite, potassium titanosilicate pharmacosiderite, sodium titanosilicate, sodium nonatitanate, or other inorganic compounds with a high affinity for strontium, and combinations thereof.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

This present invention provides novel inorganic ion exchange materials to separate $^{90}$Y from $^{90}$Sr in neutral to alkaline media. These novel inorganic ion exchange materials include clinoptilolite, potassium titanosilicate pharmacosiderite (KTS-Ph), sodium titanosilicate (NaTS) and sodium nonatitanate (NaTi). All of the ion exchangers are purely inorganic, highly radiation resistant, thermally stable, chemically stable, and non-toxic. Because of this stability, no release of toxic organic fragments is experienced, no reduction in ion exchange capacity occurs, and large levels of activity may be loaded onto a generator. Stability of the generator is essential because it has been estimated that the radiation dose in a $^{90}$Y generator containing 30 Ci of $^{90}$Sr/$^{90}$Y is as high as $10^9$ rad/day. A comparison of the characteristics of organic ion exchange resins and inorganic ion exchangers is given in Table 2.

TABLE 2

Comparison of organic ion exchange resins and inorganic ion exchange materials

| Property | Organic Resins | Inorganic Ion Exchangers |
|---|---|---|
| Thermal Stability | Low | High |
| Ion Selectivity | Low to Moderate | Moderate to High |
| Radiation Stability | Low | High |
| Physical Form | Beads, Granules, etc. | Usually powders |
| Cost | Moderate | Variable |

Figure 1:
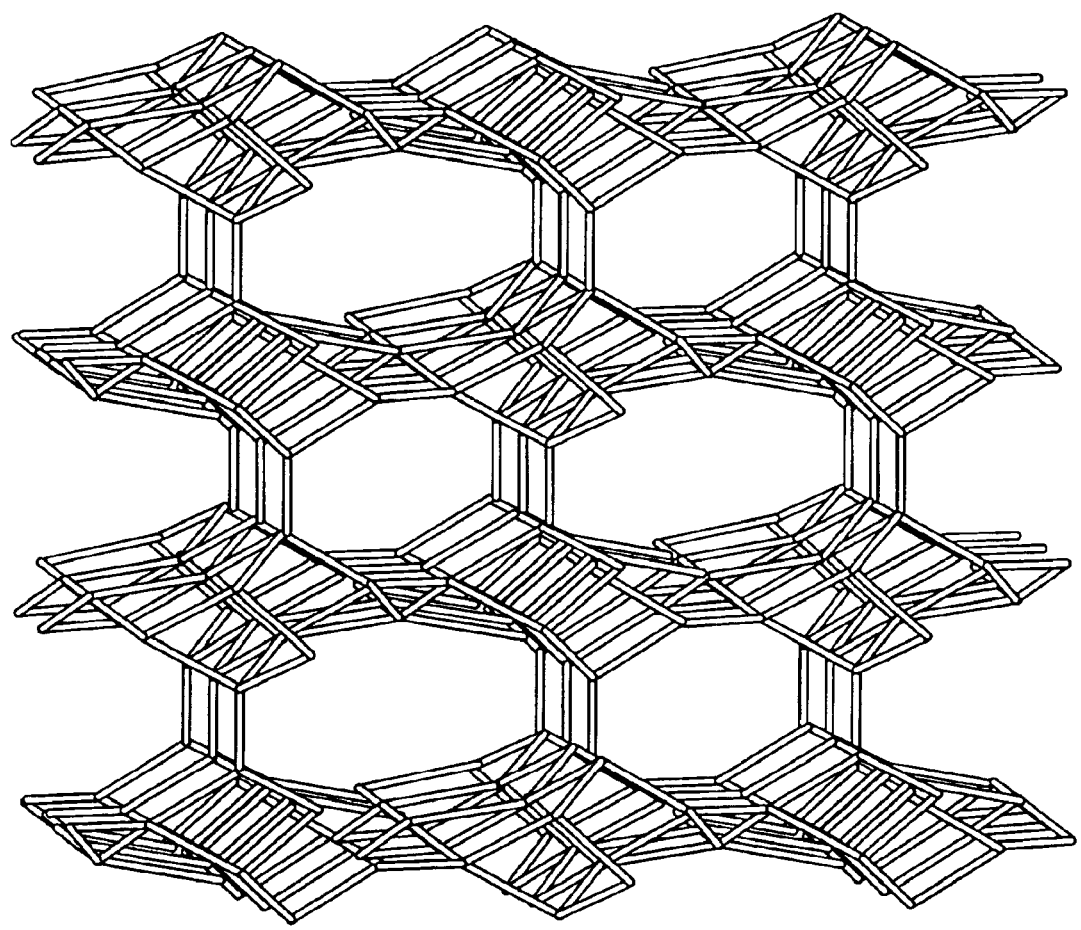
FIG. 1 is a diagram illustrating the structure of clinoptilolite illustrating the regular channels within the structure that give rise to ion sieving properties.

Clinoptilolite is a naturally occurring zeolite and has the ideal formula $Na_6Al_6Si_{30}O_{72}.24H_2O$. It is a member of the Heulandite group of zeolites and has a layered porous structure, which is depicted in FIG. 1. The ion selectivity arises due to the regular pores and channels within the zeolite structure which give rise to an ion sieving effect. The sodium ions are readily exchangeable for other cations and, in nature, $K^+$, $Mg^{2+}$ and $Ca^{2+}$ are generally also found on the exchange sites along with minor quantities of a range of other cations. Clinoptilolite has a particularly high selectivity towards $Cs^+$ and $Sr^{2+}$ ions. The cation exchange capacity of clinoptilolite is, however, fairly low and is only approximately 2.2 meq/g for the fully sodium-exchanged form.

Sodium nonatitanate, $Na_4Ti_9O_{20}.xH_2O$, is synthesized by hydrothermally treating a titanium salt, such as titanium isopropoxide, in strong base at a temperature of between 150° C. and 250° C. The reaction is outlined in Equation 2.

$$9Ti(OC_3H_7)_4 + 4NaOH_{(aq)} \rightarrow Na_4Ti_9O_{20}.xH_2O + 9C_3H_7OH \quad (2)$$

Figure 2:
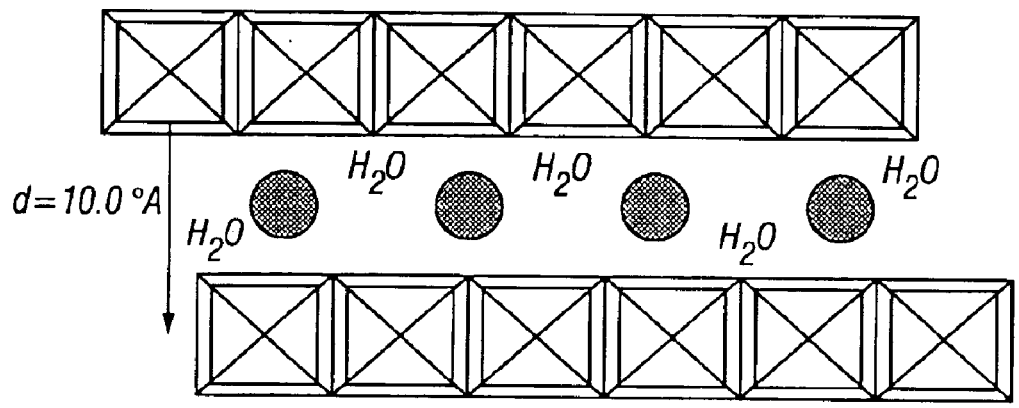
FIG. 2 is a diagram illustrating the layered structure of sodium nonatitanate, $Na_4Ti_9O_{20} \cdot xH_2O$. Sodium ions (solid circles) and water molecules are located between layers of $TiO_6$ octahedra.

The resulting sodium nonatitanate material is only poorly crystalline and its precise structure has not been determined. However, experiments have suggested that it consists of layers of $TiO_6$ octahedra separated by water molecules and sodium cations, as shown in FIG. 2. The sodium cations are weakly held and readily exchanged for strontium and other cations. The layers of $TiO_6$ octahedra are generally separated by a space of 10 Å, though this distance can vary according to the amount of water intercalated between the layers. The nonatitanate has a high selectivity for strontium at pH greater than 7, but a negligible selectivity in more acidic conditions. Thus, strontium absorbed onto the material can be readily stripped with dilute mineral acid allowing the ion exchanger to be reused. The titanate also has good thermal, radiolytic and chemical stability and is expected to have a low toxicity. The theoretical cation exchange capacity (CEC) is 4.74 meq/g, which compares favorably with organic ion exchange resins.

Figure 3:
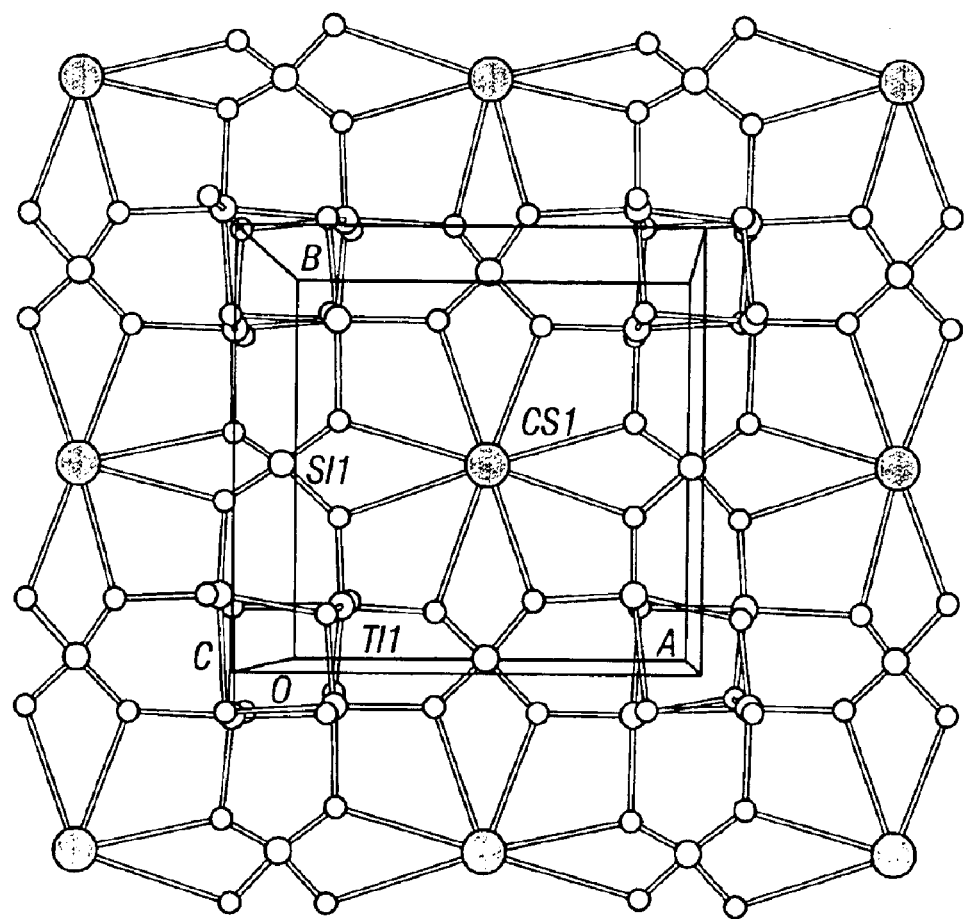
FIG. 3 is a diagram illustrating the structure of the Cs-exchanged form of the titanosilicate, NaTS.

Sodium titanosilicate (NaTS) has the ideal formula $Na_2Ti_2O_3SiO_4.2H_2O$. This material can be synthesized in a crystalline form that has allowed its structure to be determined using X-Ray powder methods. The titanosilicate was found to have a tetragonal unit cell with a=b=7.8082(2) Å and c=11.9735(4) Å. Edge-sharing $TiO_6$ clusters reside in all eight corners of the unit cell and silicate tetrahedra are located midway between the clusters and link them together. This arrangement produces tunnels parallel to the c axis where the exchangeable sodium ions and the water molecules reside. The remaining sodium ions are located in the framework, bonded by silicate oxygens and are thus not exchangeable. The structure of this ion exchange material is illustrated in FIG. 3.

Due to steric repulsions and space limitations, some of the sodium ions in the tunnels of the sodium titanosilicate are replaced by protons leading to an actual formula of $Na_{1.64}H_{0.36}Ti_2O_3SiO_4.1.84H_2O$. This exchanger was synthesized by hydrothermally heating a titanium silicate gel of appropriate stoichiometry of four moles of titanium for each mole of silicon in 6M NaOH at 170° C. for 2 days. This material has been shown to have a high selectivity for $Cs^+$ ions in both acid and alkaline pH and a high selectivity for strontium in alkaline media. Strontium is readily removed by washing with dilute acid.

Figure 4:
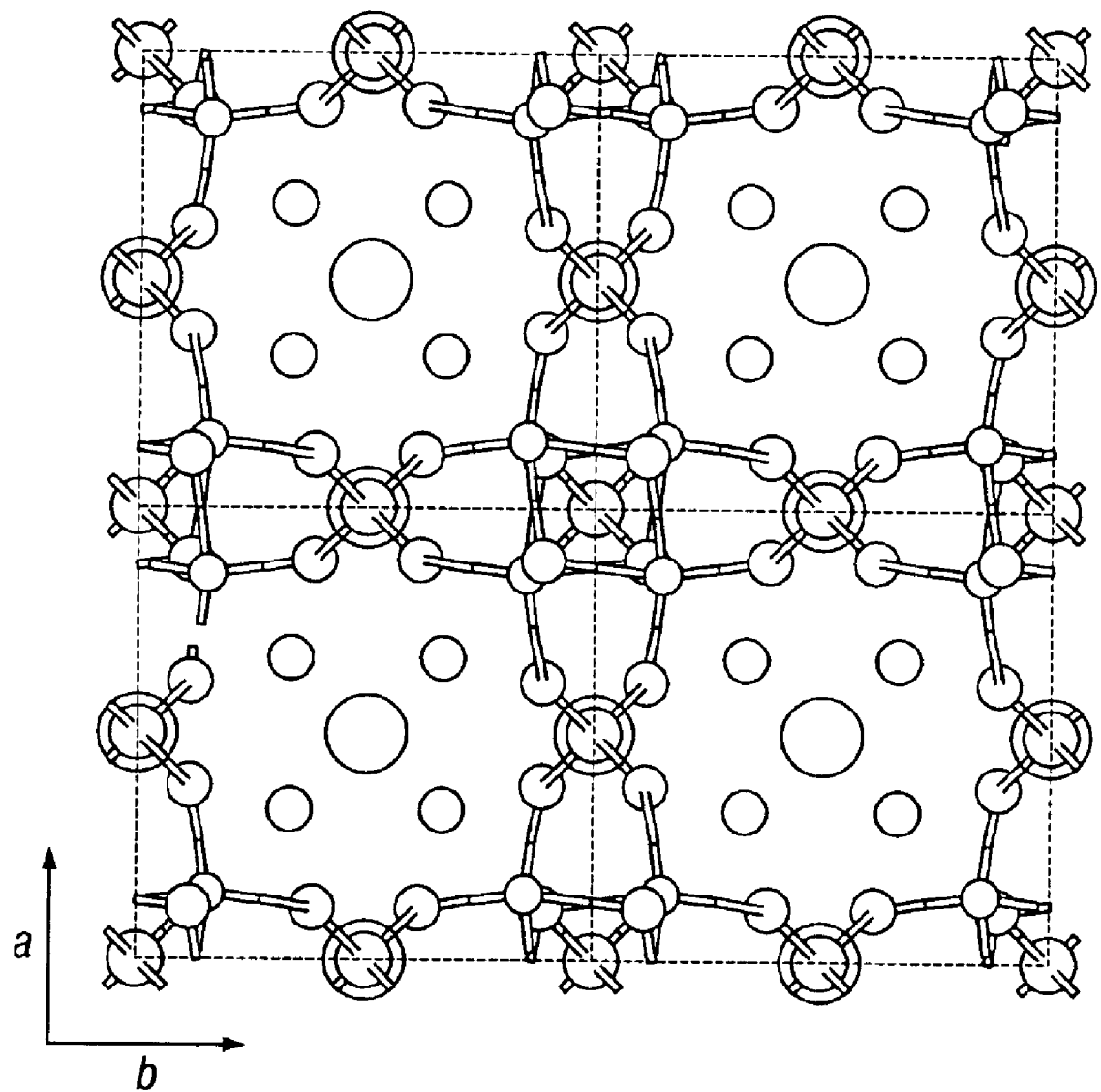
FIG. 4 is a diagram illustrating the structure of the potassium form of the pharmacosiderite titanosilicate, KTS-Ph.

The second class of titanosilicate materials has the crystal structure of the natural mineral pharmacosiderite. Pharmacosiderite has the ideal formula $KFe_4(AsO_4)_3(OH)_4$ and crystallizes in the cubic system. Titanosilicates with the general formula $M_3H(AO)_4(BO_4)_3.4-6H_2O$ (M=H, K, Na, etc.; A=Ti, Ge; B=Si, Ge) were prepared using hydrothermal techniques. A homogenous gel of appropriate stoichiometry of four moles of titanium for each three moles of silicon was hydrothermally treated in an excess of either KOH or CsOH at 200° C. for 1 to 3 days. Sodium and proton forms were then prepared by exhaustively ion exchanging the material with either NaCl or HCl. The most studied material of these is the potassium pharmacosiderite, $K_3H(TiO)_4(SiO_4)_3.4H_2O$ (KTS) in which a=b=c=7.7644(3)Å. Each unit cell consists of clusters of four titania octahedra linked to each other by silicate groups as shown in FIG. 4. This produces a series of intersecting tunnels parallel to the a, b and c axes with the exchangeable ions residing close to the face-centers of the unit cell. Pharmacosiderites have shown very high affinities towards strontium ions in alkaline solutions.

$^{90}Y/^{90}Sr$ Separation Process

The present invention provides a separation method that comprises the following steps:

(1) A source of $^{90}Sr$ is loaded onto the inorganic ion exchange material from a solution of dilute sodium salt, the loaded exchanger slurried into a column, and the column washed with fresh sodium nitrate solution to remove any residual radioactivity not bound to the exchanger.

(2) $^{90}Y$ is allowed to grow into the column.

(3) $^{90}Y$ is eluted using a dilute solution of a sodium salt or similar eluant at a pH of 7 or greater. $^{90}Sr$ is strongly held by the ion exchanger and remains on the column.

(4) Optionally, the eluted $^{90}Y$ is then passed through a small, secondary microcolumn of the ion exchange material to remove any residual traces of $^{90}Sr$ that may have been eluted from the primary ion exchange column. This small column, anticipated to be similar in size to a syringe filter, may be considered to be regarded as disposable and a fresh column is used for each $^{90}Y$ elution.

Thus, $^{90}Y$ is obtained as $Y^{3+}$ ions (carrier-free) in a sodium salt solution and the $^{90}Y$ is in a suitable form for attaching to monoclonal antibodies or for other processing. The separation process is rapid and simple requiring a minimum of steps or chemical additives. The proposed method is also amenable to the production of a $^{90}Y$ generator that can be 'milked' at the point of use to produce $^{90}Y$ on demand. Only the initial loading of the generator needs to be performed in a hot cell. Since neither the parent or daughter isotopes is a gamma emitter, shielding should not prove problematical allowing high $^{90}Sr$ activities to be loaded onto a generator. However, some lead shielding will likely be necessary due to the Bremsstrahlung radiation produced by large quantities of $^{90}Y$.

The $^{90}$Y product is also unlikely to contain any contaminants, such as $Fe^{3+}$, that could compete with $Y^{3+}$ during the synthesis of the $^{90}$Y-labelled antibody. Cationic impurities will either be strongly held onto the ion exchange material and not eluted during the $^{90}$Y milking, or will be poorly absorbed onto the ion exchanger during the initial $^{90}$Sr loading and eluted when the column is washed prior to the first $^{90}$Y milking.

EXAMPLE 1

Preliminary $^{90}$Y/$^{90}$Sr Separations

An experiment was performed to assess the feasibility of using the inorganic ion exchange materials for separation of $^{90}$Y from $^{90}$Sr. Three materials were evaluated, namely KTS-Ph, NaTi and clinoptilolite. The KTS-Ph and NaTi had previously been formed into pellets 0.2–0.5 mm in diameter using polyacrylonitrile as a binder. The clinoptilolite was supplied by BNFL Plc. of England and was already in granules suitable for column use. Approximately 1 ml of each material was slurried into a column and 25 mL of a 0.05M NaOH/0.05M $NaNO_3$ solution containing 0.1 mCi of $^{90}$Sr passed through the column over a period of approximately 5 minutes. The liquid exiting the column was collected in 5 mL fractions and counted using liquid scintillation counting (LSC). The samples were counted again at a later date and the decrease in total counts recorded. The LSC spectra did not initially suggest the presence of $^{90}$Sr (only $^{90}$Y) in any of the samples analyzed, indicating the absorption of nearly 100% of the $^{90}$Sr by the ion exchangers.

After allowing the samples to decay, a small amount of $^{90}$Sr first became visible in the spectra from the NaTi samples after 605 hours (9.45 half lives of $^{90}$Y), by which time the $^{90}$Y had decayed to less than 0.2% of it's initial activity. Although it was not possible to quantify the results with any certainty due to the contribution of $^{90}$Y produced from the residual $^{90}$Sr decay, an activity separation factor of $^{90}$Sr/$^{90}$Y of about 1000 seems likely.

Liquid scintillation counting does not allow the simultaneous determination of $^{90}$Sr and $^{90}$Y since the spectra produced by the beta emissions from the two nuclides overlap significantly. Consequently, a solution containing the two isotopes produces a 'two humped' spectrum with $^{90}$Y at the higher energy end. By counting the samples containing the partially purified $^{90}$Y at different time intervals and knowing the half life of $^{90}$Y, it is therefore possible to qualitatively note the appearance of $^{90}$Sr as the contribution due to $^{90}$Y decreases with time. Initially, the peak due to $^{90}$Y swamps any minor peak corresponding to $^{90}$Sr, but as time progresses and the $^{90}$Y decays, the $^{90}$Sr component becomes more significant and can be discerned on the scintillation spectrum.

The pharmacosiderite performed even better than the NaTi with definite $^{90}$Sr only being visible after 972 hours or over 15 $^{90}$Y half-lives, by which time the $^{90}$Y had decayed to less than 0.003% of its initial activity. Thus, a $^{90}$Sr/$^{90}$Y separation factor of much greater than 1000 was achieved.

The clinoptilolite also showed no evidence of $^{90}$Sr after 264 hours (about 4 $^{90}$Y half lives), but these experiments were terminated prior to the appearance of $^{90}$Sr.

Experiments were not performed to study the elution characteristics of the ion exchangers, but it is clear that each of the materials has a high affinity for $^{90}$Sr and a low affinity for $^{90}$Y in dilute sodium nitrate solutions making them suitable candidates for use in a $^{90}$Sr/$^{90}$Y generator system.

Although these preliminary experiments did not measure a specific $^{90}$Sr/$^{90}$Y separation factor, the results showed a very high $^{90}$Sr/$^{90}$Y separation suggesting that optimization of the loading and eluting steps of the exchanger or the use of larger ion exchange beds (or multiple beds) will allow the required separation factors of $10^6$ or greater to be readily achieved.

The ion exchange capacity of the ion exchangers is variable, with clinoptilolite having the lowest capacity. Assuming a capacity of 2 meq/g, a maximum of 1 mmol of $Sr^{2+}$ can be loaded per gram of ion exchange material. The specific activity of $^{90}$Sr is 50 Ci/g and, therefore, 1 mmol equates to 0.09 g. Thus, 9 Ci of $^{90}$Sr can be loaded onto 1 g of ion exchange material. This means that ion exchanger consumption will be minimal and thus will constitute a very minor proportion of the generator costs. Using an estimated cost of the $1,000 per kilogram for the ion exchange material, the cost of the ion exchanger will be only $1 per gram, and thus will constitute a negligible part of the total generator cost.

EXAMPLE 3

Evaluation of Ion Exchange Materials

A total of eight potentially useful ion exchange materials and one potential binder were identified. These are listed in Table I, along with the abbreviation used in subsequent tables and figures. The first step is to evaluate the affinity of the selected ion exchange materials for strontium as a function of salt concentration.

TABLE I

Inorganic Ion Exchange Materials Evaluated in Batch Tests

| Material | Abbreviation |
| --- | --- |
| Chabazite (commercial product) | AW-500 |
| Potassium pharmacosiderite (synthesized) | TA-A-2 |
| Sodium titanosilicate (synthesized) | TA-A-13 |
| Sodium nonatitanate (synthesized and hydrothermally treated for seven days) | TA-A-17 |
| Sodium nonatitanate (synthesized with no hydrothermal treatment) | TA-A-18 |
| Sodium nonatitanate (synthesized and hydrothermally treated for 21 hours) | TA-A-19 |
| Sodium nonatitanate (commercial product) | Honeywell |
| Titanium-based binder material (synthesized through the hydrolysis of Ti(i-OPr)$_4$) | Hydro $TiO_2$ |
| Sodium clinoptilolite (commercial product exchanged into sodium form) | Clino $Na^+$ |

Samples were evaluated using a simple batch technique to allow the rapid screening of a large number of materials with multiple complexants. Blanks were run for each matrix to check for any loss of strontium/yttrium during filtration or absorption of strontium/yttrium onto the scintillation vials. In all solutions evaluated, strontium absorption in the experimental blanks was negligible.

In each case 0.05 g of ion exchange materials was contacted with 10 ml of a solution, spiked with either $^{89}$Sr or $^{88}$Y, in a capped scintillation vial. (Solutions spiked with $^{88}$Y were filtered immediately before use to remove precipitated yttrium. Experience with $^{89}$Sr has shown that no precipitation occurs and they were not filtered before use.) The mixtures were shaken for 6 hours, filtered through a 0.2 μm syringe filter and the residual activity determined using liquid scintillation counting (LSC). Distribution coefficients ($K_d$ values) were then determined according to the following equation:

$$K_d = ((A_i - A_f)/A_f) \times (v/m) \qquad (2)$$

where: $A_i$ is the initial activity in solution (counts per minute/mL)

$A_f$ is final activity in solution (counts per minute/mL)

v is the volume of the solution (mL), and, m is the mass of exchanger (g)

The final pH of the solution was also noted. Six hours was chosen to allow equilibrium to be reached for each of the ion exchange materials. This period is more than adequate. Previous research has shown that the kinetics for reactions of this type are very rapid and that they generally proceed to >>95% completion in less than five minutes.[i] All experiments were performed in duplicate, and, if significant variations between duplicate samples occurred, the experiments were repeated until good agreements on the $K_d$ values were obtained.

Table II shows how the strontium distribution coefficients vary for eight ion exchange materials as the salt concentration is varied by three orders of magnitude. These results are presented here because this data was used in the design of the rest of the experiments. The Na-clinoptilolite shows the greatest variation with concentration, 3½ orders of magnitude. The strontium selectivity of both of the zeolites decreased significantly in higher ionic strength solutions, thus limiting their use to less saline solutions. (This is actually an advantage, because a requirement for a high electrolyte content, e.g., high salinity, could add complexity to later steps in the preparation of the final pharmaceutical.) Most materials showed one order of magnitude of variation or less.

TABLE II

Effect of NaCl Concentration on the Distribution Coefficient for Strontium

| Ion Exchange Material | 1 M NaCl | 0.1 M NaCl | 0.01 M NaCl | 0.001 M NaCl |
|---|---|---|---|---|
| Clino Na+ | 8 | 124 | 3,260 | 36,900 |
| AW-500 | 1,860 | 88,300 | 1,270,000 | 1,210,000 |
| TA-A-13 | 556,000 | 273,000 | 119,000 | 42,900 |
| TA-A-2 | 18,300 | 251,000 | 594,000 | 281,000 |
| Honeywell | 80,600 | 1,030,000 | 258,000 | 166,000 |
| TA-A-18 | 1,530,000 | 2,570,000 | 739,000 | 372,000 |
| TA-A-19 | 1,030,000 | 1,240,000 | 272,000 | 172,000 |
| TA-A-17 | 167,000 | 834,000 | 264,000 | 90,400 |

While the foregoing is directed to the preferred embodiment of the present invention, other and further embodiments of the invention may be devised without departing from the basic scope thereof, and the scope thereof is determined by the claims that follow.

What is claimed is:

1. A process, comprising:
   (a) preparing a solution containing strontium-90
   (b) adsorbing strontium-90 from the solution onto an inorganic ion exchange material; and
   (c) eluting yttrium-90 from the inorganic ion exchange material with an aqueous solution.

2. The process of claim 1, further comprising:
   (d) washing the inorganic ion exchange material to remove poorly bound strontium-90 prior to eluting.

3. The process of claim 2, further comprising:
   (e) allowing yttrium-90 to grow into the inorganic ion exchange material.

4. The process of claim 3, further comprising repeating steps (c) and (e).

5. The process of claim 1, wherein the inorganic ion exchange material is selected from clinoptilolite, chabazite, potassium titanosilicate pharmacosiderite, sodium titanosilicate, sodium nonatitanate, and combinations thereof.

6. A process for preparing a carrier-free solution of yttrium-90, comprising:
   (a) preparing a solution containing strontium-90;
   (b) adsorbing strontium-90 from the solution onto an inorganic ion exchange material;
   (c) washing the inorganic ion exchange material to remove poorly adsorbed strontium-90;
   (d) allowing yttrium-90 to grow into the inorganic ion exchange material; and
   (e) eluting yttrium-90 from the inorganic ion exchange material with an aqueous solution.

7. The process of claim 6, wherein the inorganic ion exchange material is selected from clinoptilolite, chabazite, potassium titanosilicate pharmacosiderite, sodium titanosilicate, sodium nonatitanate, and combinations thereof.

8. The process of claim 7, further comprising repeating steps (d) and (e) to obtain another carrier-free solution of yttrium-90.

9. The process of claim 1, wherein the inorganic ion exchange material has a high affinity for strontium.

10. The process of claim 6, wherein the inorganic ion exchange material has a high affinity for strontium.

11. The process of claim 1, further comprising:
    (d) allowing yttrium-90 to grow into the inorganic ion exchange material.

12. The process of claim 11, wherein the inorganic ion exchange material is sodium nonatitanate prepared by reacting titanium isopropoxide and aqueous sodium hydroxide at a temperature between 100° C. and 250° C. for a period between 12 hours and 2 weeks.

13. The process of claim 11, wherein the inorganic ion exchange material is sodium titanosilicate prepared by hydrothermally heating a titanium silicate gel in NaOH.

14. The process of claim 13, wherein the titanium silicate gel is hydrothermally heated in 6M NaOH at 170° C. for 2 days.

15. The process of claim 11, wherein the inorganic ion exchange material is a titanosilicate having the general formula:

$$M_3H(AO)_4(BO_4)_3 \cdot xH_2O$$

where: M is a cation selected from H, K, Na, Rb, Cs and mixtures thereof;

A is selected from Ti and Ge; and

B is selected from Si and Ge; and x is a value between 4 and 6.

16. The process of claim 11, wherein the inorganic ion exchange material is formed into pellets.

17. The process of claim 16, wherein the pellets have a diameter between 0.1 and 1.0 mm.

18. The process of claim 16, wherein the pellets have a diameter between 0.2 and 0.5 mm.

19. The process of claim 16, wherein the pellets comprise a polymeric binder.

20. The process of claim 16, wherein the pellets comprise polyacrylonitrile as a binder.

21. The process of claim 16, wherein the pellets comprise an inorganic binder.

22. The process generator of claim 20, wherein the inorganic binder is amorphous.

23. The process of claim 21, wherein the inorganic binder is selected from amorphous titanium dioxide, amorphous silica, and amorphous zirconium oxide.

24. The process of claim 11, where the solution is neutral.

25. The process of claim 11, wherein the solution has a pH greater than about 5.

* * * * *